3,249,619
CARBAMATE ESTERS OF TRICHLORO AND TETRACHLORO PYRIDINE

Howard Johnston, Walnut Creek, Calif., assignor to The Dow Chemical Company, Midland, Mich., a corporation of Delaware
No Drawing. Filed July 24, 1964, Ser. No. 385,069
7 Claims. (Cl. 260—295)

The present invention relates to carbamate esters, more particularly to chloropyridinol esters of carbamic acids having the formula

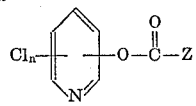

In this and succeeding formulas, Z may be —NHR or —NR'R'' wherein R is an alkyl radical containing from 1 to 18 carbon atoms, inclusive; R' and R'' are lower alkyl radicals, which together contain from 2 to 8 carbon atoms, inclusive; and $n$ is an integer from 1 to 4, inclusive.

The products of the present invention are white solids having characteristic infrared absorptions at 2.95–3.05 and 5.7–5.8 microns. They are of low solubility in water and are soluble in many organic solvents such as acetone, ethanol, methanol, isopropyl alcohol, toluene, xylene, 1,2-dimethoxyethane, dimethylformamide, etc. The carbamate esters of the present invention are useful as pesticides and are adapted to be employed as toxic constituents of nematocidal, antimicrobial, herbicidal, miticidal and anthelmintic compositions. They are particularly useful as latex and paint preservatives for the control of microorganisms causing spoilage of coating agents.

The monoalkylcarbamate esters which are represented by the formula

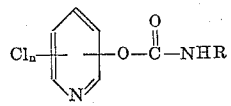

may be prepared by mixing together and intimately contacting an appropriate alkyl isocyanate represented by the formula, R—N=C=O, and an appropriate chloropyridinol represented by the formula

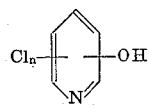

in the presence of a tertiary amine catalyst to produce the desired product.

In carrying out the reaction, the appropriate chloropyridinol and alkyl isocyanate are mixed together, preferably in an inert solvent and in the presence of a tertiary amine catalyst whereupon a reaction takes place with the formation of the desired chloropyridinyl alkylcarbamate product. Suitable solvents include dimethylformamide, methylene chloride, hexane, triethylamine and pyridine. Suitable catalysts for the reaction include triethylamine, trimethylamine and pyridine. The reaction takes place in the temperature range of from about 20° to about 40° C. After completion of the reaction, the mixture is poured onto ice or ice-water mixture to precipitate the desired chloropyridinyl alkylcarbamate product. The latter may be recovered and purified by conventional procedures such as washing, treatment with activated carbon, recrystallization, etc. Suitable solvents for recrystallization, if employed, include benzene-hexane mixture, methylene chloride-hexane mixture, dimethylformamide-hexane mixture, chloroform-heptane mixture, carbon tetrachloride-pentane mixture, etc.

In a preferred method for carrying out the reaction, the appropriate chloropyridinol and alkyl isocyanate are mixed together with a small amount of tertiary amine catalyst in an inert solvent with cooling and thereafter allowed to stand at room temperature for from about one-half hour to several days to complete the reaction with the formation of the alkylcarbamate ester product of chloropyridinol. The latter is recovered from the reaction mixture by pouring the mixture onto ice to precipitate the product. The resulting mixture is filtered to recover the product which may be purified, if desired, according to conventional procedures.

The dialkyl carbamate esters which are represented by the formula

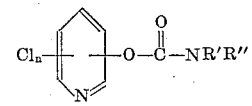

may be prepared by mixing together and intimately contacting an appropriate dialkycarbamoyl chloride represented by the formula, R'R''NCOCl, and a sodium salt of an appropriate chloropyridinol represented by the formula

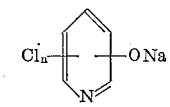

to produce the desired product.

In carrying out the reaction, the sodium salt of the appropriate chloropyridinol and dialkylcarbamoyl chloride are mixed together and intimately contacted in an appropriate solvent in the temperature range of from about 50° to 125° C. Suitable solvents include dimethoxyethane tetrahydrofuran, dioxane and benzene. The reaction is preferably carried out by heating the reactants in the temperature range of from about 80° to 100° C. This may be accomplished by heating the reaction mixture at the reflux temperature of the mixture for from about 4 to 10 hours. As a result of these operations, a reaction takes place with the formation of the desired chloropyridinyl dialkylcarbamate product and a sodium chloride by-product which precipitates in the reaction mixture. After completion of the heating, the mixture is filtered to remove the sodium chloride by-product and the filtrate heated and/or subjected to reduced pressure to remove all or part of the solvent. If all of the solvent is removed, the product is recovered as residue; if part of the solvent is removed, the product precipitates on standing or on cooling. The product may be purified, if desired, by conventional procedures.

In a preferred method for carrying out the reaction, the sodium salt of the appropriate chloropyridinol and the appropriate dialkylcarbamoyl chloride are mixed together in a solvent and the resulting mixture heated with stirring at the reflux temperature of the reaction mixture for about 4 to 8 hours to obtain the desired chloropyridinyl dialkylcarbamate product and sodium chloride by-product. The latter is removed by filtration and the mixture heated to distill off the solvent and to recover the product as residue. The product may then be purified as previously described.

The following examples illustrate the invention but are not to be construed as limiting.

EXAMPLE I

*2,3,5-trichloro-4-pyridyl methylcarbamate*

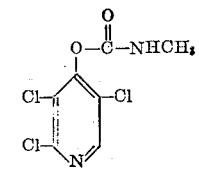

5.7 grams (0.1 mole) of methyl isocyanate was added with stirring to a solution of 14.9 grams (0.075 mole) of 2,3,5-trichloro-4-pyridinol in 50 milliliters of dimethylformamide which also contained 4 milliliters of triethylamine catalyst. The addition was carried out over a period of about 5 minutes while the reaction mixture was cooled to maintain the temperature below about 35°. The mixture was then allowed to stand for two days at room temperature. As the end of this period, the reaction mixture was poured over ice to precipitate the desired 2,3,5-trichloro-4-pyridyl methylcarbamate product as a white crystalline solid. The latter was recovered by filtration and recrystallized from benzene-hexane to obtain a purified product having a melting point of 140° C. The product had elemental analyses (in percent) as follows:

|         | Carbon | Hydrogen | Nitrogen | Chlorine |
|---------|--------|----------|----------|----------|
| Theory  | 32.8   | 1.96     | 10.70    | 41.5     |
| Found   | 32.74  | 2.11     | 10.90    | 41.62    |

EXAMPLE 2

*2,3,5,6-tetrachloro-4-pyridyl ethylcarbamate*

In a manner similar to that described in Example 1, 7.1 grams (0.1 mole) of ethyl isocyanate was added in one portion to a solution of 10.0 grams (0.05 mole) of 2,3,5,6-tetrachloro-4-pyridinol and 2 milliliters of triethylamine catalyst in 40 milliliters of dimethylformamide while the temperature was maintained at about 30° C. The mixture was allowed to stand for two days at room temperature and then poured over ice to precipitate the desired 2,3,5,6-tetrachloro-4-pyridyl ethylcarbamate product. The latter was recovered by filtration and recrystallized from ethylene chloride-hexane to obtain a purified product melting at 150° C. Infrared spectral analysis showed moderate absorption at 7.95, 8.05 and 9.3 microns in addition to the characteristic absorptions at 2.95–3.05 and 5.7–5.8 microns. The product had elemental analyses (in percent) as follows:

|         | Carbon | Hydrogen | Nitrogen | Chlorine |
|---------|--------|----------|----------|----------|
| Theory  | 31.6   | 1.99     | 9.2      | 46.7     |
| Found   | 31.53  | 1.88     | 9.03     | 46.8     |

EXAMPLE 3

*3,5,6-trichloro-2-pyridyl methylcarbamate*

In a manner similar to that described in Examples 1 and 2, 1.4 grams (0.025 mole) of methyl isocyanate was intimately contacted with 5.0 grams (0.025 mole) of 3,5,6-trichloro-2-pyridinol in the presence of 0.1 milliliter of triethylamine catalyst in 50 milliliters of dimethoxyethane to obtain a 3,5,6-trichloro-2-pyridyl methylcarbamate product having a melting point of 121°–123° C. The product had strong infrared absorption at 8.1, 8.6, 9.1, 9.3 and 10.5 microns in addition to the characteristic absorptions at 2.95–3.05 and 5.7–5.8 microns.

EXAMPLE 4

*2,3,5,6-tetrachloro-4-pyridyl methylcarbamate*

In a manner similar to that described in the foregoing examples, 2.45 grams of methyl isocyanate was intimately contacted with 10.0 grams (0.043 mole) of 2,3,5,6-tetrachloro-4-pyridinol in the presence of 0.2 milliliter of triethylamine catalyst in 40.0 milliliters of dimethoxyethane to obtain a 2,3,5,6-tetrachloro-4-pyridyl methylcarbamate product having a melting point of about 155° C. The product had strong infrared absorption at 9.15 and 10.3 microns in addition to the characteristic absorptions at 2.95–3.05 and 5.7–5.8 microns.

EXAMPLE 5

*3,4,5,6-tetrachloro-2-pyridyl methylcarbamate*

In a similar manner, 10.0 grams (0.043 mole) of 3,4,5,6-tetrachloro-4-pyridinol was intimately contacted with 2.45 grams (0.043 mole) of methyl isocyanate in the presence of 0.1 milliliter of triethylamine catalyst in 40 milliliters of dimethoxyethane to obtain a 3,4,5,6-tetrachloro-2-pyridyl methylcarbamate product having a melting point of 220°–223° C.

EXAMPLE 6

*2,3,5,6-tetrachloro-4-pyridyl n-octadecylcarbamate*

In a similar manner, 14.8 grams (0.5 mole) of n-octadecyl isocyanate was intimately contacted with 11.6 grams (0.05 mole) of 2,3,5,6-tetrachloro-4-pyridinol in the presence of 4.0 milliliters of triethylamine catalyst in 30.0 milliliters of dimethylformamide to obtain a 2,3,5,6-tetrachloro-4-pyridyl n-octadecylcarbamate product melting from 82° to 86° C. The product had strong infrared absorptions at 8.0, 9.0, 9.2 and 10.5 microns in addition to the characteristic absorptions at 2.95–3.05 and 5.7–5.8 microns.

EXAMPLE 7

In a manner similar to that described in the preceding examples, the following compounds are prepared:

3,6-dichloro-2-pyridyl methylcarbamate having a melting point of 129.2°–131.8° C. by the reaction of 3,6-dichloro-2-pyridinol and methyl isocyanate in the presence of triethylamine catalyst.

2,3,5,6-tetrachloro-4-pyridyl n-propylcarbamate having a melting point of about 130° C. by the reaction of 2,3,5,6-tetrachloro-4-pyridinol and normal-propyl isocyanate in the presence of triethylamine catalyst. The product had strong infrared absorptions at 8.05, 9.75, 10.3 and 13.9 microns in addition to the characteristic absorptions at 2.95–3.05 and 5.7–5.8 microns.

2,3,5,6-tetrachloro-4-pyridyl n-butylcarbamate having a melting point of 113° C. by the reaction of 2,3,5,6-tetrachloro-4-pyridinol and normal-butyl isocyanate in the presence of triethylamine catalyst. The product had strong infrared absorptions at 9.9, 10.5 and 13.95 microns in addition to the characteristic absorptions at 2.95–3.05 and 5.7–5.8 microns.

2,3,5-trichloro-4-pyridyl n-propylcarbamate melting from 80° to 85° C. by the reaction of 2,3,5-trichloro-4-pyridinol and normal-propyl isocyanate in the presence of triethylamine catalyst. The product had strong infrared absorptions at 6.9, 8.05 and 9.8 microns in addition to the characteristic absorptions at 2.95–3.05 and 5.7–5.8 microns.

2,3,5-trichloro-4-pyridyl n-butylcarbamate having strong infrared absorptions at 7.0, 8.15, 10.1 and 10.75 microns in addition to characteristic absorptions at 2.95–3.05 and 5.7–5.8 microns by the reaction of 2,3,5-trichloro-4-pyridinol and normal-butyl isocyanate in the presence of triethylamine catalyst.

5-chloro-3-pyridyl methylcarbamate having a melting point of 128° C. by the reaction of 5-chloro-3-pyridinol and methyl isocyanate in the presence of triethylamine catalyst. The product had strong infrared absorptions at 6.95, 7.85, 8.0, 9.1, 10.5 and 14.5 microns in addition to the characteristic absorptions at 2.95–3.05 and 5.7–5.8 microns.

2,6-dichloro-4-pyridyl n-butylcarbamate having a molecular weight of 263 by the reaction of 2,6-dichloro-4-pyridinol and normal-butyl isocyanate in the presence of triethylamine catalyst.

2,6-dichloro-4-pyridyl n-octylcarbamate having a molecular weight of 319 by the reaction of 2,6-dichloro-4- pyridinol and normal-octyl isocyanate in the presence of triethylamine catalyst.

2,6-dichloro-4-pyridyl n-heptadecylcarbamate having a molecular weight of 445 by the reaction of 2,6-dichloro-4-pyridinol and normal-heptadecyl isocyanate in the presence of triethylamine catalyst.

2-chloro-4-pyridyl n-tetradecylcarbamate having a molecular weight of 369 by the reaction of 2-chloro-4-pyridinol and normal-tetradecyl isocyanate in the presence of triethylamine catalyst.

2-chloro-4-pyridyl isoamylcarbamate having a molecular weight of 243 by the reaction of 2-chloro-4-pyridinol and isoamyl isocyanate in the presence of triethylamine catalyst.

2-chloro-4-pyridyl n-decylcarbamate having a molecular weight of 313 by the reaction of 2-chloro-4-pyridinol and normal-decyl isocyanate in the presence of triethylamine catalyst.

3,4,5,6-tetrachloro-2-pyridyl n-nonylcarbamate having a molecular weight of 402 by the reaction of 3,4,5,6-tetrachloro-2-pyridinol and normal-nonyl isocyanate in the presence of triethylamine catalyst.

3,4,5,6-tetrachloro - 2 - pyridyl n-pentadecylcarbamate having a molecular weight of 486 by the reaction of 3,4,5,6-tetrachloro-2-pyridinol and normal-pentadecyl isocyanate in the presence of triethylamine catalyst.

3,5,6-trichloro - 2 - pyridyl isobutylcarbamate having a molecular weight of 298 by the reaction of 3,5,6-trichloro-2-pyridinol and isobutyl isocyanate in the presence of triethylamine catalyst.

3,5,6-trichloro-2-pyridyl n-ndecylcarbamate having a molecular weight of 396 by the reaction of 3,5,6-trichloro-2-pyridinol and normal-undecyl isocyanate in the presence of triethylamine catalyst.

4,6-dichloro-2-pyridyl isohexylcarbamate having a molecular weight of 291 by the reaction of 4,6-dichloro-2-pyridinol and isohexyl isocyanate in the presence of triethylamine catalyst.

2,4,5,6-tetrachloro-3-pyridyl isobutylcarbamate having a molecular weight of 332 by the reaction of 2,4,5,6-tetrachloro-3-pyridinol and isobutyl isocyanate in the presence of triethylamine catalyst.

4,6-dichloro-2-pyridyl n-heptylcarbamate having a molecular weight of 305 by the reaction of 4,6-dichloro-2-pyridinol and normal-heptyl isocyanate in the presence of triethylamine catalyst.

6-chloro-2-pyridyl isopropylcarbamate having a molecular weight of 215 by the reaction of 6-chloro-2-pyridinol and isopropyl isocyanate in the presence of triethylamine catalyst.

6-chloro-2-pyridyl 2-methyl-n-butylcarbamate having a molecular weight of 243 by the reaction of 6-chloro-2-pyridinol and 2-methyl-normal-butyl isocyanate in the presence of triethylamine catalyst.

6-chloro-2-pyridyl n-dodecylcarbamate having a molecular weight of 341 by the reaction of 6-chloro-2-pyridinol and normal dodecyl isocyanate in the presence of triethylamine catalyst.

2,4,6-trichloro-3-pyridyl methylcarbamate having a molecular weight of 255 by the reaction of 2,4,6-trichloro-3-pyridinol and methyl isocyanate in the presence of triethylamine catalyst.

2,4-dichloro-3-pyridyl methylcarbamate having a molecular weight of 221 by the reaction of 2,4-dichloro-3-pyridinol and methyl isocyanate in the presence of triethylamine catalyst.

5-chloro-3-pyridyl n-octylcarbamate having a molecular weight of 285 by the reaction of 5-chloro-3-pyridinol and normal-octyl isocyanate in the presence of trimethylamine catalyst.

5-chloro-3-pyridyl n-octadecylcarbamate having a molecular weight of 425 by the reaction of 5-chloro-3-pyridinol and normal-octadecyl isocyanate in the presence of trimethylamine catalyst.

EXAMPLE 8

*2,3,5,6-tetrachloro-4-pyridyl dimethylcarbamate*

5.0 grams (0.020 mole) of the sodium salt of 2,3,5,6-tetrachloro-4-pyridinol and 2.14 grams (0.020 mole) of dimethylcarbamoyl chloride were mixed together in 100 milliliters of dimethoxyethane and the resulting mixture heated with stirring at the reflux temperature of the mixture for about two hours. As a result of these operations, a reaction took place with the formation of the desired 2,3,5,6-tetrachloro-4-pyridyl dimethylcarbamate product and a sodium chloride by-product, the latter precipitating in the reaction mixture. The sodium chloride was removed by filtration and the filtrate was distilled to remove part of the solvent. The remaining filtrate concentrate was poured into water to precipitate a solid. The aqueous mixture was made basic with ammonium hydroxide and then filtered to recover the precipitated solid. The solid was then purified by dissolving in benzene, filtering off benzene insoluble by-product and thereafter vaporizing off the benzene to recover the desired 2,3,5,6-tetrachloro-4-pyridyl dimethylcarbamate product as a tan-colored solid melting from 156° to 159° C.

EXAMPLE 9

*3,4,5,6-tetrachloro-2-pyridyl dimethylcarbamate*

In a manner similar to that described in Example 8, 10.0 grams (0.039 mole) of sodium 3,4,5,6-tetrachloro-2-pyridinolate and 4.3 grams (0.04 mole) of dimethylcarbamoyl chloride were mixed together in 60 milliliters of dimethoxyethane and the mixture heated for about 5 hours at reflux temperature to obtain the desired 3,4,5,6-tetrachloro-2-pyridyl dimethylcarbamate product having a melting point of 118–120° C.

EXAMPLE 10

*3,5,6-trichloro-2-pyridyl dimethylcarbamate*

In a similar manner, 4.4 grams (0.02 mole) of sodium 3,5,6-trichloro-2-pyridinolate and 2.14 grams (0.02 mole) of dimethylcarbamoyl chloride are mixed together in 100 milliliters of dimethoxyethane and the mixture heated for about 2 hours at reflux temperature of the reaction mixture to obtain a 3,5,6-trichloro-2-pyridyl dimethylcarbamate product having a molecular weight of 270.

EXAMPLE 11

*5-chloro-3-pyridyl diethylcarbamate*

In a similar manner, 3.0 grams (0.02 mole) of sodium 5-chloro-3-pyridinolate and 2.7 grams (0.02 mole) of diethylcarbamoyl chloride are mixed together in 100 milliliters of dimethoxyethane and the mixture heated at reflux temperature to obtain a 5-chloro-3-pyridyl diethylcarbamate product having a molecular weight of 229.

EXAMPLE 12

*2,3,5,6-tetrachloro-4-pyridyl di(n-butyl)carbamate*

In a similar manner, 5.1 grams (0.02 mole) of sodium 2,3,5,6-tetrachloro-4-pyridinolate and 3.8 grams (0.02 mole) of di-normal-butylcarbamoyl chloride are mixed together in 100 milliliters of dimethoxyethane and the mixture heated at reflux temperature to obtain a 2,3,5,6-tetrachloro-4-pyridyl di(normal-butyl)carbamate product having a molecular weight of 388.

EXAMPLE 13

In a manner similar to that described in the preceding examples, the following compounds are prepared:

2,3,5,6 - tetrachloro - 4 - pyridyl methylethylcarbamate having a molecular weight of 318 by the reaction of sodium 2,3,5,6-tetrachloro-4-pyridinolate and methylethylcarbamoyl chloride.

2,3,5-trichloro-4-pyridyl diethylcarbamate having a molecular weight of 298 by the reaction of sodium 2,3,5-trichloro-4-pyridinolate and diethylcarbamoyl chloride.

2,3,5-trichloro-4-pyridyl methylbutylcarbamate having a molecular weight of 312 by the reaction of sodium 2,3,5-trichloro-4-pyridinolate and methylbutylcarbamoyl chloride.

2,3,5-trichloro-4-pyridyl dimethylcarbamate having a molecular weight of 270 by the reaction of sodium 2,3,5-trichloro-4-pyridinolate and dimethylcarbamoyl chloride.

2,6-dichloro-4-pyridyl methyl-n-propylcarbamate having a molecular weight of 263 by the reaction of sodium 2,6-dichloro-4-pyridinolate and methyl-normal-propylcarbamoyl chloride.

2,6-dichloro-4-pyridyl di(n-propyl)carbamate having a molecular weight of 291 by the reaction of sodium 2,6-dichloropyridinolate and di(normal propyl)carbamoyl chloride.

3,4,5,6-tetrachloro - 2 - pyridyl di(n-propyl)carbamate having a molecular weight of 360 by the reaction of sodium 3,4,5,6-tetrachloro-2-pyridinolate and di(normal-propyl)carbamoyl chloride.

3,4,5,6 - tetrachloro-2-pyridyl n-butylmethylcarbamate having a molecular weight of 346 by the reaction of sodium 3,4,5,6-tetrachloro-2-pyridinolate and normal-butyl-methylcarbamoyl chloride.

3,5,6-trichloro-2-pyridyl ethylmethylcarbamate having a molecular weight of 284 by the reaction of sodium 3,5,6-trichloro-2-pyridinolate and ethylmethylcarbamoyl chloride.

3,5,6-trichloro-2-pyridyl di(n-propyl)carbamate having a molecular weight of 326 by the reaction of sodium 3,5,6-trichloro-2-pyridinolate and di(normal-propyl)carbamoyl chloride.

4,6-dichloro-2-pyridyl n-butyl-n-propylcarbamate having a molecular weight of 305 by the reaction of sodium 4,6-dichloro-2-pyridinolate and normal-butyl-normal-propylcarbamoyl chloride.

4,6-dichloro-2-pyridyl dimethylcarbamate having a molecular weight of 235 by the reaction of sodium 4,6-dichloro-2-pyridinolate and dimethylcarbamoyl chloride.

6-chloro-2-pyridyl di(n-butyl)carbamate having a molecular weight of 285 by the reaction of sodium 6-chloro-2-pyridinolate and di(normal-butyl)carbamoyl chloride.

6-chloro-2-pyridyl dimethylcarbamate having a molecular weight of 201 by the reaction of sodium 6-chloro-2-pyridinolate and dimethylcarbamoyl chloride.

2,4,6-trichloro-3-pyridyl dimethylcarbamate having a molecular weight of 270 by the reaction of sodium 2,4,6-trichloro-3-pyridinolate and dimethylcarbamoyl chloride.

2,4-dichloro-3-pyridyl di(n-butyl)carbamate having a molecular weight of 319 by the reaction of sodium 2,4-dichloro-3-pyridinolate and di(normal-butyl)carbamoyl chloride.

5-chloro-3-pyridyl n-butylmethylcarbamate having a molecular weight of 243 by the reaction of sodium 5-chloro-3-pyridinolate and normal-butylmethylcarbamoyl chloride.

5-chloro-3-pyridyl di(n-butyl)carbamate having a molecular weight of 285 by the reaction of sodium 5-chloro-3-pyridinolate and di(normal-butyl)carbamoyl chloride.

5-chloro-3-pyridyl ethylmethylcarbamate having a molecular weight of 215 by the reaction of sodium 5-chloro-3-pyridinolate and ethylmethylcarbamoyl chloride.

2-chloro-4-pyridyl dimethylcarbamate having a molecular weight of 201 by the reaction of sodium 2-chloro-4-pyridinolate and dimethylcarbamoyl chloride.

2-chloro-4-pyridyl ethylmethylcarbamate having a molecular weight of 215 by the reaction of sodium 2-chloro-4-pyridinolate and ethylmethylcarbamoyl chloride.

2-chloro-4-pyridyl di(n-butyl)carbamate having a molecular weight of 285 by the reaction of sodium 2-chloro-4-pyridinolate and di(normal-butyl)carbamoyl chloride.

The product carbamate esters of the present invention are useful as pesticides and are adapted to be employed as toxic constituents for the control of nematodes, fungi, bacteria, weeds and weed seeds, mites and helminths infesting warm-blooded animals.

The products of the present invention, particularly, the mono-alkylcarbamates are useful as antimicrobial agents and are adapted to be employed as toxic constituents of bactericidal and fungicidal compositions. Typical of the organisms whose growth may be inhibited are *Salmonella typhosa, Staphylococcus aureus, Aspergillus terreus, Pullularia pullulans, Rhizopus nigricans* and various mold organisms infecting latex and oil paint compositions. Representative of control of microbial growth are the following operations: 3,5,6-trichloro-2-pyridyl methylcarbamate and 2,3,5,6-tetrachloro-4-pyridyl methylcarbamate were separately dispersed in agar culture media to provide a concentration therein of 0.05 percent of one of the compounds and the media separately inoculated with a test organism and thereafter incubated at 30° C. for 3 days. At the end of this period, complete inhibitions of growth of *Rhizopus nigricans, Pullularia pullulans, Aspergillus terreus, Staphylococcus aureus* and *Salmonella typhosa* were observed.

The carbamate esters are useful as herbicides, suitable for the control and kill of both broad-leaf and narrow-leaf plant species. In representative operations, 2,3,5,6-tetrachloro-4-pyridyl ethylcarbamate and 2,3,5,6-tetrachloro-4-pyridyl dimethylcarbamate were separately dispersed in aqueous media to produce a spray composition containing one of the esters at a concentration of 2 pounds per 100 gallons of aqueous medium. These compositions were sprayed onto cucumber plants and the plants observed after about one week. The results showed complete foliage destruction of the treated plants.

The carbamate esters are also useful for the control of various soil-dwelling organisms. Representative of such use is the control of nematodes. In operations for the control of nematodes, nematode infested soil was treated in separate operations with 3,4,5,6-tetrachloro-2-pyridyl methylcarbamate and 3,4,5,6-tetrachloro-2-pyridyl dimethylcarbamate at a rate of 5 parts by weight of one of the carbamates per million parts by weight of soil. After about 7 days, the treated as well as untreated soil were planted to cucumber seeds, the cucumber plants allowed to germinate and grow for several weeks and then the roots of plants grown in both treated and untreated soil examined for nematode infestation. It was found that the roots of the plants grown in treated soil were free of nematodes infestation.

The preferred compounds of the present invention for the variety of pesticidal properties exhibited are the carbamate esters which may be represented by the formula

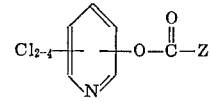

wherein Z is represented by a member of the group consisting of —NHR and —NR'R" wherein R is an alkyl radical containing from 1 to 18 carbon atoms, inclusive, and R' and R" are lower alkyl radicals which together contain from 2 to 8 carbon atoms, inclusive.

The chloropyridinols suitable as starting materials for the preparation of the compounds of the present invention may be prepared by heating an appropriate chloropyridine having one more chlorine atom than the desired chloropyridinol with about 10 percent caustic at temperatures of from about 160° C. to about 190° C. for about 2 to 3 hours. This is the preferred method for preparing chloro-substituted 2- and 4-pyridinols. Alternatively, the desired chloropyridinols may be prepared by passing chlorine through a carbon tetrachloride solution of pyridinol. The latter method is the preferred method for the preparation of chloro-substituted 3-pyridinols. The sodium salt of chloropyridinol may be prepared by reacting sodium with chloropyridinol according to conventional procedures.

The dialkylcarbamoyl chlorides suitable as starting materials for preparing the dialkylcarbamate esters may be prepared by reacting phosgene with a secondary amine in the vapor phase at temperatures of about 240°–350° C. The alkyl isocyanates suitable as starting materials for preparing alkylcarbamate esters may be prepared by reacting phosgene with primary amine in the vapor phase or in an inert liquid medium to obtain an intermediate carbamoyl chloride and thereafter refluxing the latter in an inert solvent or by treating with a tertiary amine. Suitable procedures for the preparation of the foregoing starting materials are more fully described and noted on pages 640–641 of "Synthetic Organic Chemistry," by Wagner and Zook, John Wiley & Sons, Inc., New York, 1953.

I claim:

1. A carbamate ester having the formula

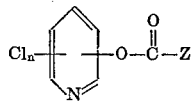

wherein Z is represented by a member of the group consisting of —NHR and —NR'R'' wherein R is an alkyl radical containing from 1 to 18 carbon atoms, inclusive; R' and R'' are lower alkyl radicals, which together contain from 2 to 8 carbon atoms, inclusive; and $n$ is an integer of from 1 to 4, inclusive.

2. 3,5,6-trichloro-2-pyridyl methylcarbamate.
3. 2,3,5,6-tetrachloro-4-pyridyl methylcarbamate.
4. 2,3,5,6-tetrachloro-4-pyridyl ethylcarbamate.
5. 2,3,5,6-tetrachloro-4-pyridyl dimethylcarbamate.
6. 2,3,5,6-tetrachloro-4-pyridyl n-octadecylcarbamate.
7. 3,4,5,6-tetrachloro-2-pyridyl methylcarbamate.

No references cited.

WALTER A. MODANCE, *Primary Examiner.*

A. L. ROTMAN, *Examiner.*